United States Patent [19]
Mochizuki

[11] Patent Number: 5,844,546
[45] Date of Patent: Dec. 1, 1998

[54] KEYBOARD WITH CURSOR CONTROL

[75] Inventor: Isao Mochizuki, Kaizu-gun, Japan

[73] Assignee: Brother Kogyo Kabushiki Kaisha, Nagoya, Japan

[21] Appl. No.: 679,395

[22] Filed: Jul. 9, 1996

[30] Foreign Application Priority Data

Jul. 10, 1995 [JP] Japan ................................. 7-173538

[51] Int. Cl.⁶ .................................................. G09G 5/08
[52] U.S. Cl. ........................................... 345/161; 345/168
[58] Field of Search .................................. 345/156, 168, 345/160, 161

[56] References Cited

U.S. PATENT DOCUMENTS

| | | |
|---|---|---|
| 4,811,288 | 3/1989 | Kleijne et al. ............................ 365/52 |
| 5,278,371 | 1/1994 | Watanabe et al. . |
| 5,521,596 | 5/1996 | Selker et al. ............................ 345/161 |
| 5,541,622 | 7/1996 | Engle et al. ............................ 345/161 |
| 5,594,618 | 1/1997 | Sellers .................................... 345/161 |

FOREIGN PATENT DOCUMENTS

| | | |
|---|---|---|
| 5-225858 | 9/1993 | Japan . |
| 8-31264 | 2/1996 | Japan . |

*Primary Examiner*—Richard Hjerpe
*Assistant Examiner*—Vui T. Tran
*Attorney, Agent, or Firm*—Oliff and Berridge P.L.C.

[57] ABSTRACT

A keyboard including a cursor control for commanding movement of a cursor displayed on a display screen and including at least a post portion and a base plate supporting the post portion; and a base portion supporting a plurality of key switches and including at least two layers sandwiching the base plate.

21 Claims, 4 Drawing Sheets

KEYBOARD WITH CURSOR CONTROL

BACKGROUND OF THE INVENTION

1. Field of the Invention

The present invention relates to a keyboard with a cursor controller used in the input device and the like of word processors, computers, and other similar devices.

2. Description of the Related Art

Conventional keyboards are provided with cursor keys for moving a cursor vertically and horizontally across a screen. Some keyboards are alternatively provided with a roller ball or a mouse for performing the same function.

U.S. Pat. 5,278,371 describes a keyboard with pop-up keys. Such a keyboard can be provided with a cursor controller 132 as shown in FIG. 1. The cursor controller 132 is formed from a substantially flat and plate-shaped resin base plate 33, a substantially square-columnar resin post portion 134, and a rubber cap 123 positioned on the upper end of the post portion 134. The base plate 133 and the post portion 134 are integrally formed together. Two distortion sensors 135 are adhered to the outer peripheral surface of the post portion 134 at 90 intervals. Of the two distortion sensors 135, one is for detecting distortion in an up-down direction, and the other is for detecting distortion in a left-right direction. A flexible cable 136 is soldered to the terminals of the distortion sensors 135. Accordingly, when force is applied to the post portion 134 via the rubber cap 123, distortion is generated at the post portion 134. The distortion sensors 135 convert the distortion into a distortion signal. The distortion signal is transmitted to a control portion (not shown in a drawings) via the flexible cable 136. Sometimes four distortion sensors are adhered around the peripheral surface of the post portion 134 at 90 intervals.

A base portion 1K is provided to the keyboard. The base portion 1K includes a holder member 101, a printed circuit board 125, and a reinforcement member 126. The holder member 101 and the printed circuit board 125 are formed with an opening 139 positioned at the location of the base plate 133. The open portion 139 is formed to a size substantially the same as an external contour of the base plate 133. Upright pawls 137 for fixing the base plate 133 in place are formed to the reinforcement member 126 using bending machining techniques and the like. Accordingly, the base plate 133 of the cursor controller 132 is fixed in place by the upright pawls 137 from the reinforcement member 126 at the open portion 139 formed in the holder member 101 and the printed circuit board 125. The post portion 134 covered by the rubber cap 123 protrudes from between adjacent key tops 115. Because the base plate 133 protrudes above the holder member 101, cutout portions 115K are machined into the key tops 115 around the cursor controller 132 so that when the keys tops 115 are pressed down, they will not strike the protruding base plate 133.

Another example of a keyboard with a cursor controller is shown in FIG. 2. The configuration of this cursor controller 232 is similar to that of the cursor controller 232 shown in FIG. 1 and includes a substantially flat shape resin base plate 233, a substantially square columnar resin post portion 234, and a rubber cap 223 positioned at the upper tip of the post portion 234. The base plate 233 of the cursor controller 232 is fixed in the place by screws 238 located beneath the reinforcement member 226. A hole 239 is opened in the reinforcement member 226 as well as in the printed circuit board 225 and the holder member 201. The resin post portion 234 covered by the rubber cap 223 protrudes through the hole 239 and from between adjacent key tops 215.

However, in a keyboard with a cursor controller configured as shown in FIG. 1, the resin base plate 133 of the cursor controller 132 must be formed relatively thick in order to be rigid enough to withstand forces transmitted from the resin post portion 134. This makes it difficult to form the keyboard to a thin shape for use in a thin keyboard in laptop-type personal computer.

Also, when the keyboard with the cursor controller 132 is used in a thin keyboard in laptop-type personal computer, the open portion 139, which is formed in the holder member 101 to a size substantially the same as the outer form of the base plate 133 of the cursor controller 132, lowers the overall rigidity of the keyboard.

Also, because the open portion 139 is provided in the holder member 101 of the keyboard, and because the base plate 133 is fixed within the open portion 139, the base plate 133 of the cursor controller 132 is visible from between adjacent key tops 115 and appears out of place.

Further, because the base plate 133 of the cursor controller 132 is formed thickly, the edge of the key top 115 must be cut to form the cut portions 115K in order to obtain a sufficiently long key stroke in a thin type keyboard.

Also, extra work, such as machining processes, is required to form the pawls 139 that fix the cursor controller 132 to the keyboard.

On the other hand, the keyboard shown in FIG. 2 overcomes some of the problems of the keyboard shown in FIG. 1. For example, a user does not get a feeling of incongruity because the base plate 233 is not visible from above. Also the edge of the key tops 215 need not to be cut and extra machining processes are not required to produce pawls. However, if the keyboard shown in FIG. 2 were used in a thin keyboard in a laptop-type personal computer, the thick base plate 233 located beneath the reinforcement member 226 would get in the way of the controller board positioned beneath the keyboard. Also, the thickness of the keyboard would be increased by the thickness of the base plate 233 so that it would be difficult to produce a thin keyboard.

SUMMARY OF THE INVENTION

It is an objective of the present invention to overcome the above-described problems and to provide a thin keyboard with a sufficiently long key stroke, with a simple configuration, with sufficient rigidity, with an appealing external appearance, and which is inexpensive to produce.

In order to achieve the above-described objective, a keyboard according to the present invention includes a cursor control for commanding movement of a cursor displayed on a display screen and including at least a post portion and a base plate supporting the post portion; and a base portion supporting a plurality of key switches and including at least two layers sandwiching the base plate.

According to another aspect of the present invention, a keyboard including a cursor control is assembled by mounting a base plate portion of the cursor control including the base plate portion and a post portion on a reinforcement member; and mounting a holder member formed with a post portion protrusion hole on the base plate portion and the reinforcement member so that the post portion protrudes through the post portion protrusion hole and so that the base plate portion is sandwiched between the reinforcement member and the holder member.

According to still another aspect of the present invention, a keyboard including a cursor control is assembled by mounting a holder member, which is formed with a post portion protrusion hole and weld pins, on a reinforcement member, which is formed with an open portion and, at positions corresponding to the weld pins, weld pin through holes, so that the weld pins pass through corresponding weld pin through holes; welding the weld pins in place; installing the cursor controller including a base plate and a post portion through the open portion so that the post portion passes through the post portion protrusion hole; and mounting a support cover to the open portion so that the base plate of the cursor controller is sandwiched between the holder member and the support cover.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 3:
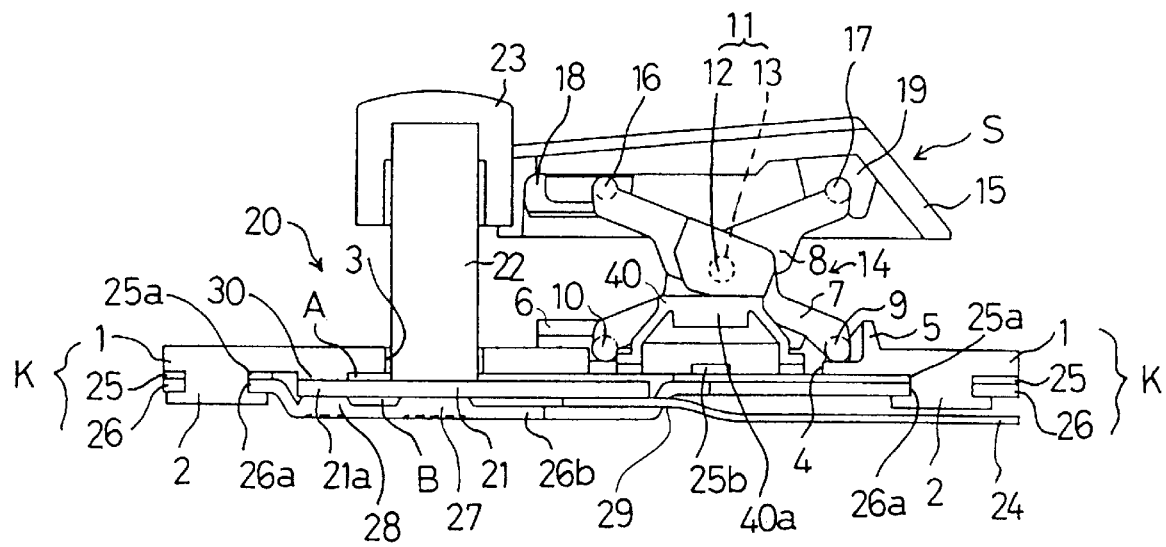
FIG. 3 is a cross-sectional view showing a portion of a keyboard with a cursor control according to a first embodiment of the present invention.
Figure 4:
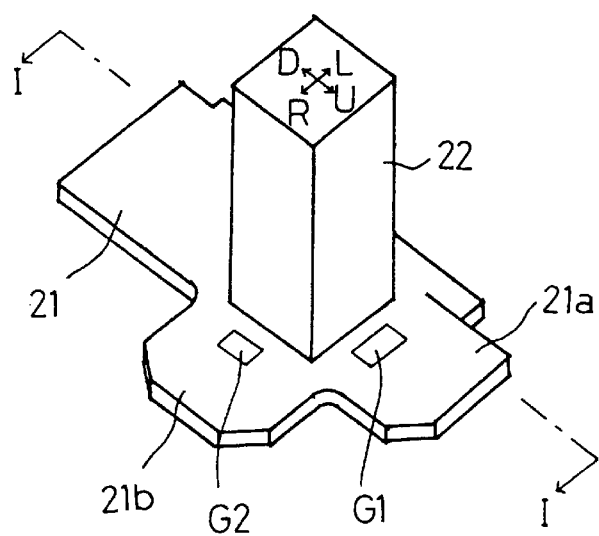
FIG. 4 is a perspective view showing details of the cursor control shown in FIG. 3.
Figure 5:
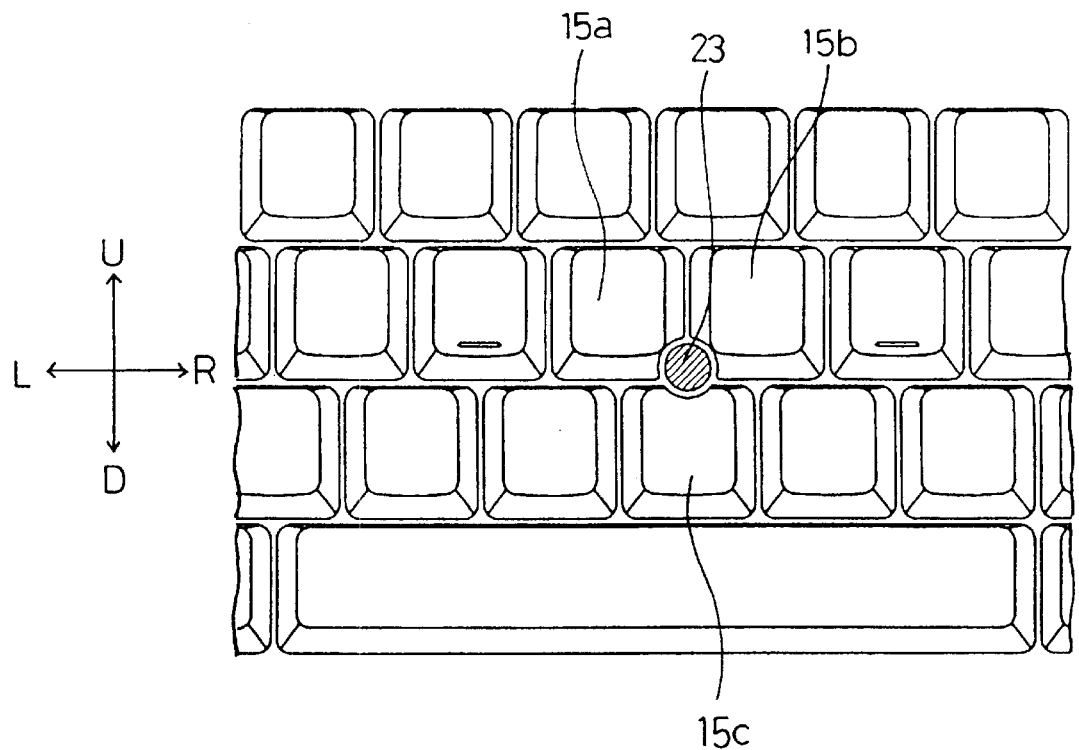
FIG. 5 is a plan view showing the keyboard of FIG. 3.

The configuration of a keyboard according to a first embodiment of the present invention will be described while referring to FIGS. 3, 4, and 5. Up, down, left, right, and other directional terms will be used to described orientation of components when the keyboard is positioned in a manner in which it is to be used. FIG. 3 is a partial cross-section of a keyboard with a cursor controller 20 according to the first embodiment of the present invention. FIG. 4 is a perspective view of the base plate portion K and a post portion 22 of the cursor controller 20 shown in FIG. 3. FIG. 5 is a partial plane view of the keyboard according to the present embodiment.

The keyboard according to the present embodiment includes one cursor controller 20, a base portion K, and a plurality of key switches S provided to the base portion K. The cursor controller 20 includes a base plate portion 21, a post portion 22, a rubber cap 23, and a lead wire 24.

The base plate portion 21 is formed into a thin plate shape from a material, such as a ceramic having sufficient rigidity even when formed thin. As shown in FIG. 4, two distortion sensors G1, G2 are printed on the surface of the base plate 21. Although not shown in the drawings, a circuit pattern also printed on the surface of the base plate 21. Alternatively, the distortion sensors G1, G2 can be adhered to the surface of the base plate portion 21. Whether printed or adhered, four sensors could be provided to the base plate portion 21 or alternatively the post portion 22.

A holder member 1 and a reinforcement member 26, both to be described later, include respectively a base plate fixing portion 30 and a base plate support portion 28. As shown in FIG. 4, two support portions 21a, 21b of the base plate portion 21 are provided at 90 angles to each other around the post portion 22.

As shown in FIG. 3, the support portion 21a is firmly sandwiched between the base plate fixing portion 30 and the base plate support portion 28. Although not shown in the drawings, the support portion 21b is firmly sandwiched in the same manner between a base plate fixing portion and a base plate support portion both to the rear of the post portion 22 and the base plate portion 21 shown in FIG. 3. A base plate support portion 27 is formed in the reinforcement member 26 directly beneath the post portion 22. The support portions are centered on the base plate support portion 27.

The post portion 22 is formed into a substantially square-columned shape from a material having sufficient rigidity such as a ceramic material or a composite resin. The post portion 22 is firmly fixed to the base plate portion 21, for example using adhesive. Alternatively, the post portion 22 could be formed integrally with the base plate portion 21. Further, the post portion 23 could be formed into a substantially round-columned shape.

The rubber cap 23 is formed from a compound.rubber, for example, and is fixed to the top end of the post portion 22. The surface of the rubber cap 23 could be formed with a rough surface to prevent a user's finger from slipping during use. This would make the cursor controller easier to use.

The lead wire 24 is formed from a flexible cable attached by solder, for example, to the base plate 21. The lead wire 24 is for transmitting distortion signals from the distortion sensors G1, G2 to a control portion (not shown in the drawings). Also, a shield for preventing electric noise could be additionally provided to the lead wire 24.

The base portion K is formed from three layers including a holder member 1, a printed circuit board 25, and a reinforcement member 26. The printed circuit board 25 is sandwiched between the holder member 1 and the reinforcement member 26.

The holder member 1 is formed from a compound resin such as a fiber glass reinforced compound resin. The holder member 1 includes a weld pin 2, the base plate fixing -portion 30, a hole 3 through which the post portion 22 protrudes, a hole 4 through which a rubber spring 40 protrudes, a pivotal stop portion 5 for stopping a guide member 14, and a slide stop portion 6, all integrally formed in the holder member 1.

The weld pin 2 is provided so as to protrude from below the surface of the holder portion 1, that is from the surface opposite a key switch S (to be described later). The weld pin 2 is welded in place after being passed through a weld pin through hole 25a provided in the printed circuit board 25 and through a weld pin through hole 26a provided in the reinforcement member 26. As a result, as shown in FIG. 3, the printed circuit board 25 is fixedly sandwiched between the holder member 1 and the reinforcement member 26, thereby forming a three-layered structure.

The base plate fixing portion 30 is provided to the holder member 1 so as to protrude downward from the same surface to which the weld pin 2 is provided. In association with a base plate support portion 28 of the reinforcement member 26 (to be described later), the base plate fixing portion 30 fixedly supports the support portions 21a, 21b of the base plate 21.

The post portion protrusion hole 3 is a substantially square-shaped hole provided in the holder member 1, and is provided for allowing the post portion 22 of the cursor controller 20 to protrude above the base portion K.

Alternatively, the post portion protrusion hole 3 could be provided with a circular shape when the post portion 22 is provided with a substantially circular columned shape.

The rubber spring protrusion hole 4 is one of the plurality of holes provided in the holder member 1. Each of the plurality of rubber springs 40 is provided in a corresponding rubber spring protrusion hole 4 protruding upward and in engagement with a corresponding guide portion 14. Each of the plurality of rubber springs 40 is adhered to the base portion K at positions corresponding to a pressing contact portion 25b provided in the printed circuit board 25.

The pivotal stop portion 5 is provided on a surface of the holder member 1 adjacent to the key switch S. The pivotal stop portion 5 is for stopping pivoting motion of a pivoting portion 9 of a first link 7 of the key switch S (to be described later).

In the same manner as the pivotal stop portion 5, a slide stop portion 6 is provided to the surface of the holder member 1 to which is provided the key switch S. The slide stop portion 6 stops sliding movement of a sliding pin portion 10 provided to a second link 8 of the key switch S.

The printed circuit board 25 is formed from a substrate such as polyethylene terephthalate substrate on which is printed a circuit pattern from a material such as silver or carbon. The circuit pattern includes the pressing contact portions 25b located at positions corresponding to each of the key switches S. Each rubber spring 40 is attached so as to cover a corresponding pressing contact portion 25b. The rubber spring 40 will be described in further detail later. An open portion with a size substantially the same as the size of the base plate 21 is formed in the printed circuit board 25 at the position where the cursor controller 20 is attached. The weld pin through hole 25a, through which passes the weld pin 2 of the holder member 1, is formed in the printed circuit board 25. The printed circuit board 25 could be formed from a single layer or from a plurality of layers, for example two layers or three layers.

The reinforcement member 26 is formed using press machining techniques on an aluminum plate or on a steel plate. The reinforcement member 26 is formed with an indentation portion 26b at portions below the base plate portion 21 of the cursor controller 20. The reinforcement member 26 is provided with the base plate support portion 28, a lead wire draw portion 29 and the weld pin through hole 26a through which passes the weld pin 2 of the holder member 1.

The base plate support portion 28 is a protrusion provided to the same surface of the reinforcement member 26 as the indentation 26b and faces the holder member 1. The base plate support portion 28 works in association with the base plate fixing portion 30 of the holder member 1 to fixedly support the support portions 21a, 21b of the base plate 21.

The lead wire drawing portion 28 is an opening provided substantially at a side of the indentation 26a. The lead wire 24 attached to the base plate portion 21 is drawn through the lead wire drawing portion 28 to below the reinforcement member 26.

Each of the plurality of key switches S is formed from the guide member 14 held in place by the holder member 1 1 and a rubber spring 40 attached so as to cover a corresponding pressing contact portion 25b on the printed circuit board 25.

The guide member 14 is formed from a first link 7 and a second link 8. The first and second links 7, 8 are formed from a compound resin such as a fiberglass compound resin. It is desirable that the guide member 14 and the holder member 1 be formed from different types of compound resin. The first and second links 7, 8 are pivotally connected to each other by a shaft support portion 11. The shaft support portion 11 is formed from a support access 12 provided to the first link 7 and a support hole 13 provided in the second link 8. A slide pin portion 16 provided to the first link 7 is stopped from sliding beyond a certain point by a sliding stop portion 18 provided to the rear surface of the key top 15. A pivotal pin portion 17 provided to the second link 7 is stopped from pivoting beyond a certain angle by a pivotal stop portion 19 provided at the rear surface of the key top 15. A pivotal pin 9 provided to the first link 7 is stopped from pivoting beyond a certain angle by a pivot stop portion 5 provided to the holder member 1. A slide pin portion 10 provided to the second link 8 is stopped from sliding beyond a certain point by a slide stop portion 6 provided to the holder member 1.

The key top 15 is formed with a compound resin such as ABS resin. Symbols and characters such as numbers and English letters are printed on or are engraved in the upper surface of the key top 15. Both the stop portion 18 and the pivot stop portion 19 are provided to the lower surface of the key top 15.

The rubber spring 40 has a shape of an inverted cup. The rubber spring 40 is adhered to the printed circuit board 25 so as to cover a pressing contact portion 25b at a position corresponding to a location of the key switch S. The rubber spring 40 is provided so as to protrude through the open portion 4 of the holder member 1. The support shaft 12 of the guide portion 14 is mounted on the apex of the rubber spring 40. A conductive portion 40a for energizing the pressing contact portion 25b is provided to the interior of the rubber spring 40.

With this configuration when a user depresses the key top 15 of the key switch S, the support shaft 12 of the guide portion 14 compresses the rubber spring 40 against the resilience of the rubber spring 40. The conductive portion 40a of the rubber spring 40 contacts the pressing contact portion 25b so that the pressing contact portion 25b is energized. In this way, the key switch S operates as a switch. When the user releases the key top 15, the rubber spring 40 returns to its original shape due to its resiliency. Therefore, the conductive portion 40a and the pressing contact portion 25b fall out of contact with each other so that the energization of the pressing contact portion 25b stops.

To assemble the keyboard according to the present embodiment, the rubber spring 40 is adhered to the printed circuit board 25. Then the printed circuit board 25 is mounted onto the reinforcement member 26. Then the base plate portion 21 is aligned with and mounted on the base plate support portion 28 and the indentation 26b of the reinforcement member 26. At this time the lead wire 24 attached to the cursor controller 20 is drawn through the lead wire draw portion 28 of the reinforcement member 26 so as to extend beneath the reinforcement member 26 as shown in FIG. 3. Then the holder member 1 is aligned with and mounted on the printed circuit board 25. At this point, the holder member 1 is mounted so that the post portion 22 protrudes through the post portion protrusion hole 3 of the holder member 1, so that the rubber spring 40 adhered to the printed circuit board 25 protrudes through the rubber spring protrusion hole 4 of the holder member 1, and so that each weld pin 2 of the holder member 1 passes through a corresponding weld pin through hole 25a of the printed circuit board 25 and weld pin through hole 26a of the reinforcement member 26.

After confirming that each member is in sufficient contact, the weld pins 2 are welded in place. When the weld pins 2 of the holder member 1 are welded in place, the support portion 21a of the base plate portion 21 will be firmly sandwiched between the base plate fixing portion 30 of the holder member 1 and the base plate support portion 28 of the reinforcement member 26. Existence of the base plate support portion 27, base plate fixing portion 30, and base plate support portion 28 forms gaps A and B at a position corresponding to where the distortion sensor G1 is formed on the support portion 21a.

Although the support portion 21b of the base plate portion 21 is located to the rear of the base plate portion 21 and the post portion 22 as viewed in FIG. 4, and so is not visible in FIG. 3, the support portion 21b is also firmly sandwiched between the base plate fixing portion of the holder member 1 and the base plate support portion of the reinforcement member 26 so that gaps are formed by the base plate support portion 27, base plate fixing portion 30, and base plate support portion 28 at positions above and below the support portion 21b where the distortion sensor G2 is printed.

In this way, the printed circuit board 25 and the base plate portion 21 of the cursor controller 20 are firmly sandwiched between the reinforcement member 26 and the holder member 1. After a plurality of the guide members 14 are attached to the holder member 1, the key tops 15 are attached to the corresponding guide members 14. By attaching the rubber cap 23 to the top of the post portion 22, the keyboard according to the present embodiment is completed.

The completed keyboard according to the present embodiment appears as shown in plane view in FIG. 5. As can be seen the rubber cap 23 protrudes from between a plurality of the key tops 15a, 15b, and 15c. Accordingly the key tops 15a, 15b, 15c are formed with substantially arc shaped cutout portions following the shape of the rubber cap 23.

Next, an explanation will be provided for the operation of the cursor controller 20 while referring to FIGS. 3 through 6.

First, an example will be given for when a user presses the rubber cap 23, that is, the post portion 22 in the direction indicated by the arrow U in FIG. 3. As described above, the support portion 21a of the base plate portion 21 is firmly sandwiched between the base plate fixing portion 30 of the holder member 1 and the base plate support portion 28 of the reinforcement member 26. Furthermore, the base plate portion 21 is supported by the base plate support portion 27 located directly beneath the post portion 22.

When a user presses the rubber cap 23 of the cursor controller 20 in the direction indicated by the arrow U of FIG. 5, the base plate support portion 27, which is located directly beneath the post portion 22, serves as a fulcrum. The base plate portion 21 of the cursor controller 20 distorts downward in the direction of the gap B between the base plate support portions 27, 28. Because this distortion sensor G1 is printed at the position of the gap B between the base plate support portion 27, 28, the distortion sensor G1 detects the distortion in the U-D direction of the base plate portion 21 shown in FIGS. 3 and 5.

The distortion sensor 21 converts the detected distortion into a distortion signal. The distortion signal is transmitted to the control portion via the lead wire 24. The distortion signal causes a cursor C to move upward on a display portion 50, that is, in the U direction shown in FIG. 6. The cursor C moves in the U direction on the display portion 50 by an amount proportional to the size and duration of the distortion signal. When the user releases the post portion 22 of the cursor controller 20, the distortion of the base plate portion 21 will vanish so that the movement of the cursor C across the display 50 will stop.

Figure 6:
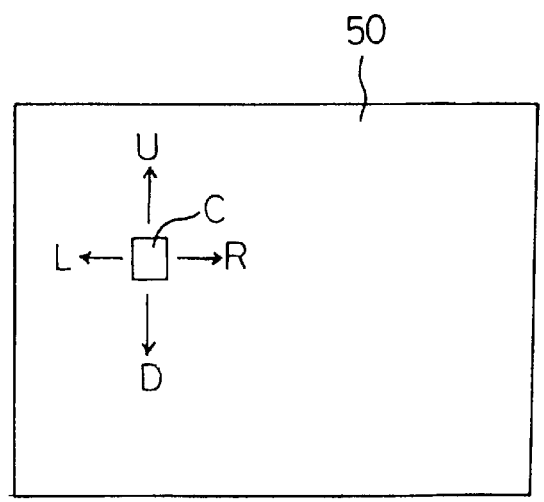
FIG. 6 is a plan view showing a cursor displayed on a display according to operation of the cursor control.

Contrarily, when the user presses the post portion 22 in a direction indicated by the arrow D of FIG. 5, the base plate support portion 27, which is located directly beneath the post portion 22, serves as a fulcrum. The base plate portion 21 of the cursor controller 20 distorts upward as viewed in FIG. 3 in the direction of the gap A between the base plate support portions 27, 28. The distortion signal transmitted to the control portion when the base plate portion 21a is distorted toward the gap A, which is formed between the support portions 27, 28, causes the cursor C to move in the D direction on the display portion 50 as shown in FIG. 6. The cursor C moves in the D direction on the display portion 50 by an amount proportional to the size and duration of the distortion signal. When the user releases the post portion 22 of the cursor controller 20, the distortion of the base plate portion 21 will vanish so that the movement of the cursor C across the display 50 will stop.

Next, an example will be given for when a user presses the rubber cap 23, that is, the post portion 22 in the direction indicated by the arrow R in FIG. 5. Although not shown in the drawings, the support portion 21b of the base plate portion 21 is firmly sandwiched between a base plate fixing portion of the holder member 1 and a base plate support portion of the reinforcement member 26. Furthermore, the base plate portion 21 is supported by the base plate support portion 27 of the reinforcement member 26 located directly beneath the post portion 22.

When the user presses the rubber cap 23 of the cursor controller 20 in the direction indicated by the arrow R of FIG. 5, the base plate support portion 27, which is located directly beneath the post portion 22, serves as a fulcrum. The support portion 21b of the cursor controller 20 distorts downward as viewed in FIG. 3 in the direction of the gap between the base plate support portions (not shown in the drawings because they are provided behind the base plate support portion 27 and the post portion 22). Because this distortion sensor G2 is printed at the position of the gap between the base plate support portions (not shown in the drawings) and the base plate support portion 27, which is above the support portion 21b, the distortion sensor G2 detects the distortion in the L-R direction of the base plate portion 21.

Figure 1:
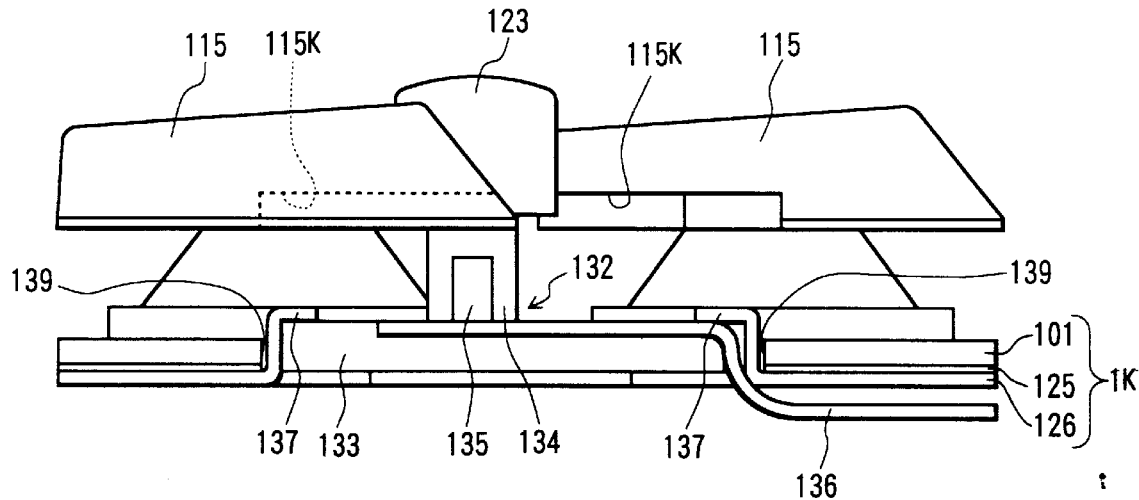
FIG. 1 is a cross-sectional view showing a portion of a conventional keyboard with a cursor controller.
Figure 2:
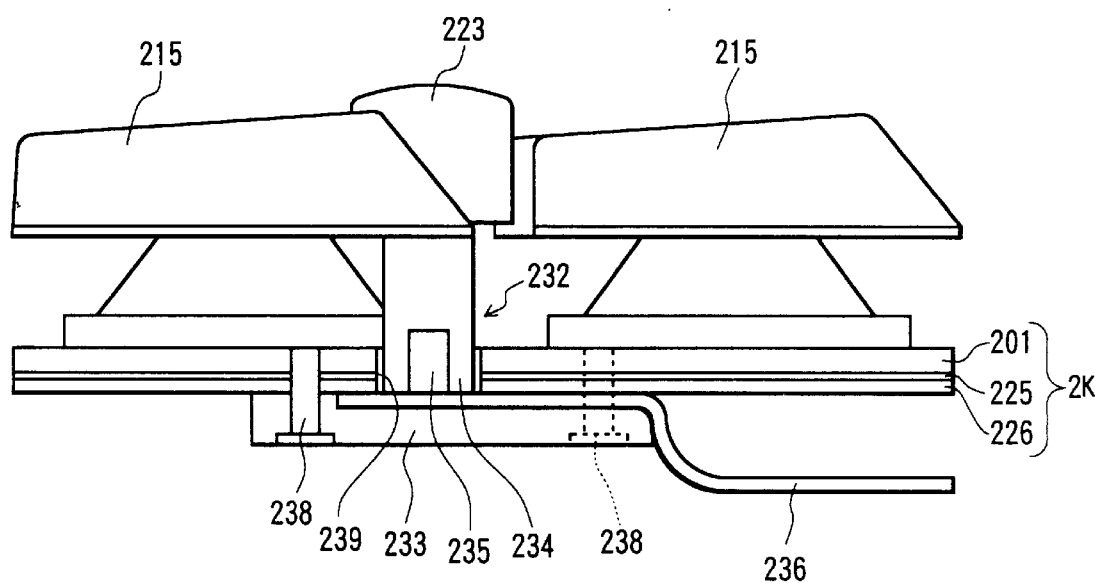
FIG. 2 is a cross-sectional view showing a portion of another conventional keyboard with a cursor controller.

A distortion signal is transmitted to the control portion when the base plate portion 21 distorts downward as viewed in FIG. 1 towards the position of the gap between the base plate support portion (not shown in the drawings) and the base plate support portion 27. This distortion signal causes the cursor C to move in the R direction on the display portion 50 shown in FIG. 6. The cursor C moves in the R direction on the display portion 50 by an amount proportional to the size and duration of the distortion signal. When the user releases the post portion 22 of the cursor controller 20, the distortion of the base plate portion 21 will vanish so that the movement of the cursor C across the display 50 will stop.

Contrarily, when the user presses the post portion 22 in a direction indicated by the arrow L of FIG. 5, the base plate support portion 27, which is located directly beneath the post portion 22, serves as a fulcrum. The support portion 21b of the cursor controller 20 distorts in upward as viewed in FIG. 3 in the direction of the gap between the base plate support portions (not shown in the drawings) and the base plate support portion 27. A distortion signal is transmitted to the control portion when the base plate portion 21 distorts upward as viewed in FIG. 1 towards the position of the gap between the base plate support portion (not shown in the drawings) and the base plate support portion 27. This distortion signal causes the cursor C to move in the L direction on the display portion 50 shown in FIG. 4 to a degree proportional to the strength and duration of the distortion signal. When the user releases the pressure from the post portion 22 of the cursor controller 20, the distortion of the base plate portion 21 will vanish so that the movement of the cursor C across the display 50 will stop.

By printing two distortion sensors G1, G2 for the X and Y axial directions, that is L-R and U-D directions respectively, on the base plate portion 21, the cursor controller 20 can be used to control the movement of the cursor across the screen on the display. However, as an alternative method for detecting distortion, distortion sensors can be provided beneath the distortion sensors G1, G2 to form a bridge-type assembly so that the distortion detection is more stable in a variety of environments, such as in variable humility.

Figure 7:
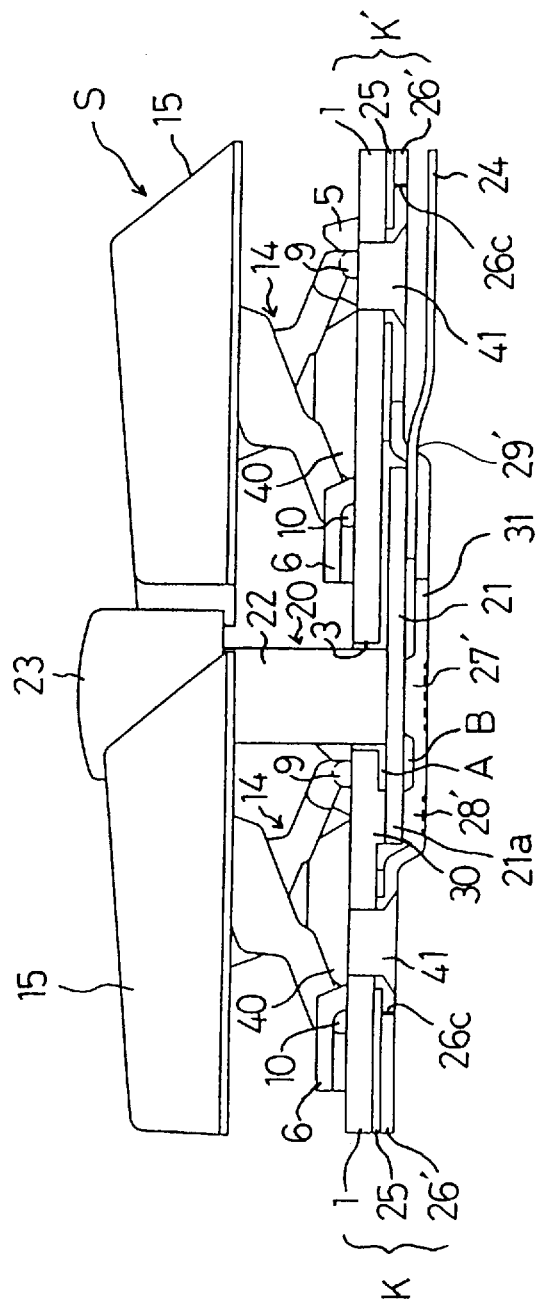
FIG. 7 is a cross-sectional view showing a portion of keyboard with a cursor control according to a second embodiment of the present invention.

FIG. 7 shows a keyboard according to a second embodiment of the present invention. FIG. 7 shows the keyboard after assembly. In the second embodiment, a portion of a reinforcement member 26' including a base plate support portion 28' is cut out to form a supporting cover 31. The supporting cover 31 fits into an open portion 26c opened in the reinforcement member 26' when cutting out the supporting cover 31. The supporting cover 31 and the open portion 26c enable installing the cursor controller 20 after components of the base portion K' have been assembled.

To assemble the keyboard according to the present embodiment, the printed circuit board 25, to which is adhered the rubber spring 40, is aligned with and mounted on the reinforcement member 26'. Then the holder member 1 is aligned with and mounted on the printed circuit board 25. At this point the holder member 1 is aligned and mounted so that the rubber spring 40 adhered to the printed circuit board 25 protrudes through the rubber spring protrusion hole 4 of the holder member 1 so that each weld pin (not shown in the drawings) of the holder member 1 passes through respective weld pin through holes (not shown in the drawings) of the reinforcement member 26' and through weld pin through holes (not shown in the drawings) of the printed circuit board 25.

After confirming that corresponding portions are sufficiently in contact with each other, the weld pins are welded in place. After the weld pins have all been welded in place, the cursor controller 20 is installed from the underside of the base portion K through the open portion 26c formed by cutting out the support cover 31. At this point, the cursor controller 20 is installed so that the post portion 22 protrudes through the post portion protrusion hole 3 of the holder member 1.

Next, the support cover 31 is positioned to and mounted in the open portion 26c. At this time, the lead wire 24 attached to the cursor controller 20 is drawn through a lead wire draw portion 29' of the support cover 31 so as to extend beneath the reinforcement member 26' as shown in FIG. 7. Lastly, the support cover 31 is screwed to the holder member 1 by screws 41.

As shown in FIG. 7, the support portion 21a of the base plate 21 is firmly sandwiched between the base plate fixing portion 30 of the holder member 1 and the base plate support portion 28' of the supporting cover 31. Further, the gaps A and B are formed at the positions where the sensor G1 is printed on the support portion 21a and the base plate support portion 27'. Although not shown in FIG. 7, a support portion 21b of the base plate portion 21 is positioned behind, as viewed in FIG. 7, the base plate portion 21 and the post portion 22. The support portion 21b of the base plate portion 21 is also firmly sandwiched between the not shown base plate fixing portion of the holder member 1 and the not shown base plate portion of the support cover 31. The existence of the base plate support portion 27' forms gaps above and below the support portion 21b at the position where the sensor G2 is formed on the support portion 21b.

In this way, the printed circuit board 25 is firmly sandwiched between the reinforcement member 26' and the holder member 1. Also the base plate portion 21 is firmly sandwiched between the support cover 31 and the holder member 1. After the plurality of guide members 14 are attached to the holder member 1, key tops 15 are attached to corresponding guide members 14. Attaching the rubber cap 23 to the top of the post portion 22 completes assembly of the keyboard according to the second embodiment. The keyboard according to the second embodiment has improved operability and better yield than the keyboard of the first embodiment.

The base plate portion of the cursor controller according to the present embodiments is formed in a thin plate shape from a rigid material such as ceramic. Further, the base plate portion is firmly sandwiched between a holder member and a reinforcement member which are components comprising the keyboard base. As a result, there is no need to form a large open portion in the holder member. There is also no need to fix the reinforcement member in place using screws, or using pawls that protrude upright from the reinforcement member. Therefore, the base portion of the keyboard is strongly rigid.

Also, because there is no need to form a large open portion in the holder member of the keyboard, the base plate portion of the cursor controller is not visible through gaps between adjacent key tops. Therefore, the user will not have a feeling of incongruity, so that the keyboard is more aesthetically pleasing.

Because the base plate portion of the cursor controller is formed in a thin shape from a ceramics material, there is no need to cut the edges of key tops to produce a long stroke.

Because the cursor controller is attached in the keyboard by being sandwiched between other components, there is no need for processes such as tightening screws and bending the reinforcement plate to form pawls.

Because the base plate is sandwiched between the other components, there is no need to attach the base plate beneath the reinforcement member. Therefore, the base plate portion will not get in the way of the controller board provided beneath the keyboard.

The cursor controller is easily installed when the base plate portion of the cursor controller is sandwiched between the holder member and the support cover, which are components comprising the keyboard.

While the invention has been described in detail with reference to specific embodiments thereof, it would be apparent to those skilled in the art that various changes and modifications may be made therein without departing from the spirit of the invention, the scope of which is defined by the attached claims.

For example, by adhering the base plate portion of the cursor controller to the base plate support portion of the reinforcement member, operability is improved and the cursor controller is more firmly fixed in place.

Further, a portion of the holder member can serve as a cover member instead of a portion of the reinforcement member. In this case, after the cursor controller is mounted on the base plate support portion of the reinforcement member, the cover member can be used to sandwich the cursor controller from above. Then the cover member can be pressed down and fixed in place using screws.

Although it was described in the above embodiments that distortion sensors was printed or adhered to the base plate portion, distortion sensors could be printed or adhered to the post portion instead.

Although it was described in the embodiments that support portions of the base plate portion were provided to two locations, support portions could be provided at three or four locations.

Because the base plate portion of the cursor controller is sandwiched and fixed in place between the holder member and the reinforcement member of the keyboard of the present invention, nothing protrudes from the holder member except the post portion. For this reason the keyboard has great rigidity and nothing is visible between adjacent key tops. There is also no need to cut the edge of the key tops, so that a number of processes can be reduced. Therefore the keyboard according to the present invention provides a thin and inexpensive keyboard with a controller. By sandwiching components of the cursor controller between a holder member, which is a portion of the keyboard, and the cover member, which is another component, the assembly of the keyboard, including components of the controller, becomes simpler.

What is claimed is:

1. A keyboard, comprising:

a cursor control for commanding movement of a cursor displayed on a display screen and including at least a post portion and a base plate supporting the post portion; and a base portion supporting a plurality of key switches and including a base member and a base plate supporting member, the base member having a hole sized to slidably receive the post portion of the cursor control in a close-fitting relationship while permitting the post portion to tilt therewithin, the base plate supporting member and the base member being connected to each other with the base plate sandwiched therebetween to thereby releasably retain the cursor control to the base portion to yield a reduced thickness of the base portion.

2. A keyboard as claimed in claim 1 wherein the base plate comprises a ceramic material.

3. A keyboard as claimed in claim 1 further wherein the cursor control further comprises a rubber cap attached to an end of the post portion opposite the base plate, the rubber cap being provided with a rough surface.

4. A keyboard as claimed in claim 1 wherein:

the base plate of the cursor control includes at least two support portions protruding from the post portion; and the base portion is provided at at least two locations with sandwiching portions for sandwiching therebetween corresponding ones of the support portions of the base plate.

5. A keyboard as claimed in claim 4 wherein:

the base portion is formed from at least a layer-shaped holder member supporting the key switches and a layer-shaped reinforcement member for reinforcing the holder member; and the base plate portion is sandwiched between the holder member and the reinforcement member.

6. A keyboard as claimed in claim 5 wherein the holder member is formed with an open portion exposing the base plate portion and includes a cover member covering the open portion, the reinforcement member and the cover member sandwiching therebetween the base plate.

7. A keyboard as claimed in claim 5 wherein the reinforcement member is formed with an open portion exposing the base plate portion and includes a cover member covering the open portion, the holder member and the cover member sandwiching therebetween the base plate.

8. A keyboard as claimed in claim 4 wherein the base portion includes a protruding support portion sandwiching a portion of the base plate between itself and the post portion of the cursor control, and further comprising sensors provided to the base plate between the support portions of the base plate and the portion of the base plate sandwiched between the protruding support portion of the base portion and the post portion of the cursor control.

9. A keyboard as claimed in claim 8 wherein the sensors are printed on the base plate.

10. A keyboard as claimed in claim 8 wherein the sensors are adhered to the base plate.

11. A keyboard as claimed in claim 1 wherein:

the base portion is formed from at least a layer-shaped holder member supporting the key switches and a layer-shaped reinforcement member for reinforcing the holder member; and the base plate portion is sandwiched between the holder member and the reinforcement member.

12. A keyboard as claimed in claim 11 wherein the holder member is formed with an open portion exposing the base plate portion and includes a cover member covering the open portion, the reinforcement member and the cover member sandwiching therebetween the base plate.

13. A keyboard as claimed in claim 11 wherein the reinforcement member is formed with an open portion exposing the base plate portion and includes a cover member covering the open portion, the holder member and the cover member sandwiching therebetween the base plate.

14. A keyboard as claimed in claim 11 wherein the holder member is formed with a hole having substantially a same shape as an outer periphery of the post portion, the post portion protruding through the hole.

15. A keyboard as claimed in claim 1 wherein the at least two layers includes a first layer and a second layer, the first layer including an open portion exposing the base plate portion and a cover member covering the open portion, the first layer and the cover member sandwiching therebetween the base plate.

16. A keyboard as claimed in claim 15 wherein:

the base plate of the cursor control includes at least two support portions protruding from the post portion; and the base portion is provided at at least two locations with sandwiching portions for sandwiching therebetween corresponding ones of the support portions of the base plate.

17. A keyboard as claimed in claim 15 wherein the cover is screwed to the second layer.

18. A method of assembling a keyboard including a cursor control, the method including the steps of:

mounting a base plate portion of the cursor control including the base plate portion and a post portion on a reinforcement member; and mounting a holder member formed with a post portion protrusion hole on the base plate portion, the post portion protrusion hole sized to receive the post portion in a close-fitting relationship while permitting the post portion to tilt therewithin, so that the post portion protrudes through the post portion protrusion hole and so that the base plate portion is sandwiched between the reinforcement member and the holder member.

19. A method of assembling a keyboard including a cursor control, the method including the steps of:

mounting a holder member, which is formed with a post portion protrusion hole and weld pins, on a reinforcement member, which is formed with an open portion and, at positions corresponding to the weld pins, weld pin through holes, so that the weld pins pass through corresponding weld pin through holes;

welding the weld pins in place;

installing the cursor controller including a base plate and a post portion through the open portion so that the post portion passes through the post portion protrusion hole sized to receive the post portion in a close-fitting relationship while permitting the post portion to tilt therewithin; and mounting a support cover to the open portion so that the base plate of the cursor controller is sandwiched between the holder member and the support cover.

20. A keyboard as claimed in claim 1, wherein the base member and the base plate supporting member are in contact with the base plate.

21. A keyboard as claimed in claim 1, wherein the post portion extends in a first direction and the base plate, the base member, and the base plate supporting member extend in a second direction perpendicular to the first direction, the base plate supporting member and the base member sandwiching the base plate in the first direction.

* * * * *